United States Patent [19]
Cain et al.

[11] Patent Number: 5,791,657
[45] Date of Patent: *Aug. 11, 1998

[54] SEALS CONTAINING COMPOSITE NON-EXTRUSION SPRINGS

[75] Inventors: David E. Cain; Andrew C. Posluszny; Rudolf R. Schoen, all of Houston; Jerald L. Smith, Conroe; Robert K. Stoddard, Kingwood, all of Tex.; John C. Vicic, Santa Cruz, Calif.; Christopher E. Cunningham, Kongsberg, Norway; Steven M. French, New Brighton, Minn.; Jim Tait, Dunfermline, Scotland

[73] Assignee: FMC Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 780,661

[22] Filed: Jan. 7, 1997

Related U.S. Application Data

[63] Continuation of Ser. No. 216,004, Mar. 22, 1994, abandoned.

[51] Int. Cl.⁶ ........................................... F16J 15/18
[52] U.S. Cl. .................. 277/554; 277/322; 277/537; 277/556
[58] Field of Search .................. 277/164, 554, 277/322, 537, 556

[56] References Cited

U.S. PATENT DOCUMENTS

| | | | |
|---|---|---|---|
| 4,235,427 | 11/1980 | Bialobrzeski | 277/212 FB |
| 4,379,558 | 4/1983 | Pippert | 277/164 |
| 4,795,468 | 1/1989 | Hodorek et al. | 623/18 |
| 4,881,329 | 11/1989 | Crowley | 36/38 |
| 5,158,271 | 10/1992 | Hein | 267/281 |
| 5,163,692 | 11/1992 | Schofield et al. | 277/164 |

*Primary Examiner*—Daniel G. DePumpo
*Attorney, Agent, or Firm*—Henry C. Query, Jr.

[57] ABSTRACT

A wellhead seal assembly for sealing between first and second pipe members comprises an annular elastomeric body having, in cross-section, a generally rectangular shape comprising a first flat radial surface, a second flat radial surface, an inner circumferential surface and an outer circumferential surface; said inner circumferential surface comprises a generally convex portion that extends from an imaginary plane connecting the inner circumferential edge of each of said first radial surface and said second radial surface; said seal assembly further comprises at least one annular, non-metallic spring member in said elastomeric body positioned generally tangentially to the intersection of either of said radial surfaces with said inner circumferential surface.

2 Claims, 1 Drawing Sheet

FIG_1
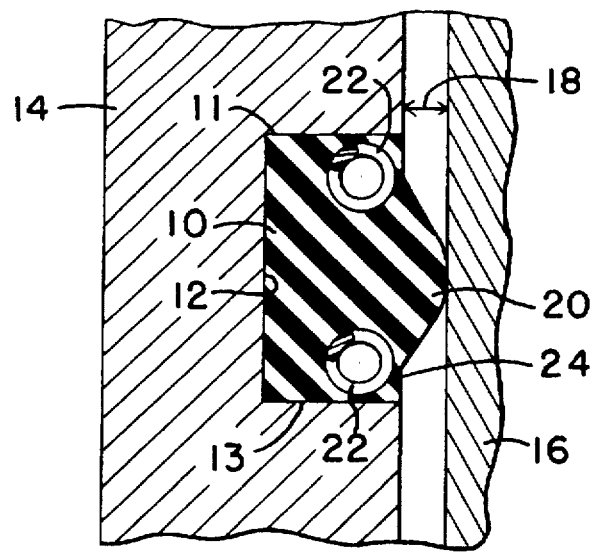
FIG_2
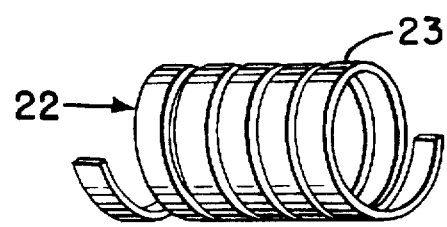
FIG_3
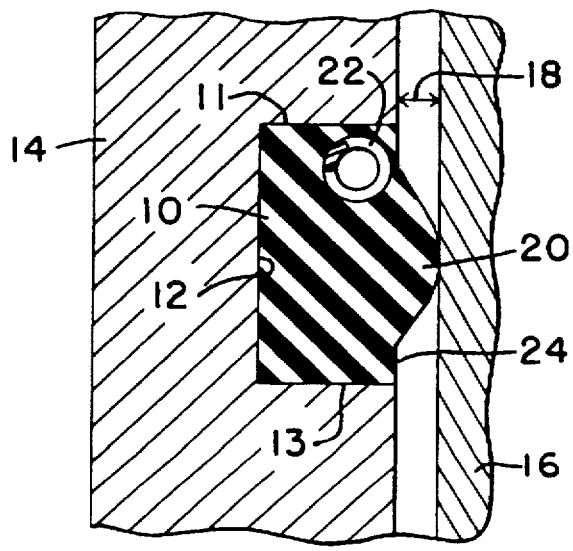

SEALS CONTAINING COMPOSITE NON-EXTRUSION SPRINGS

This application is a continuation of application Ser. No. 08/216,004, filed Mar. 22, 1994, now abandoned.

BACKGROUND OF THE INVENTION

This invention relates to seals for use between telescopically intermitting pipe members such as oil casings and wellheads, and more particularly to elastomeric seals designed to seal across interfitting pipe members designed with relatively large tolerances.

Seals for use between, for example, casing and wellheads must be able to withstand conditions of high temperature and pressure while providing an effective seal between a wellhead and a rough casing surface. Because of relatively large tolerances, and the fact that the casing is often eccentric with respect to a wellhead bore, a relatively large gap can be created between the casing and the wellhead. For the same reasons, a relatively small gap can occur. Thus, there is a need for a versatile seal that will accommodate a rough casing surface and varying gap sizes between pipe members.

Certain S-seals used in oil field applications are designed primarily for static conditions in wellbores, such as between wellheads and hangers. Such S-seals comprise an annular elastomeric seal body having embedded therein a plurality of annular metal springs for providing support and anti-extrusion properties. The springs are typically located in such a way to prevent direct contact with or rubbing on sealing surfaces during installation. Occasionally, however, the springs can separate from the elastomer seal body due to the friction between the elastomer body and the metal sealing surfaces, or due to suction or currents developed while the seals are displacing various fluids.

If the metal springs separate from the seal they can become trapped in a crevice of a well bore and cause damage to bore or hanger surfaces. The metal spring is usually harder than the steel material of the wellhead. Thus, the spring may grind, cut, or scratch the surfaces. Further damage can be attributed to the loss of the spring, which would cause the elastomer seal body to be vulnerable to extrusion and thus lead to rapid deterioration of the elastomer seal body under pressure. Furthermore, if metal spring particles fall into the well bore they can cause similar damage to running tools and instruments in the bore. The presence of the metal springs may also cause galvanic corrosion to various components.

For the above reasons, there is a need for a non-extrusion device for a seal body that is strong enough to resist high pressures and temperatures and maintain a strong bond with the elastomer seal body; softer than the base material of the wellhead components to prevent scratching; and non-metallic to avoid galvanic corrosion.

SUMMARY OF THE INVENTION

The present invention comprises an annular elastomeric seal body having a generally rectangular cross-section including at least one annular non-metallic spring member embedded therein. The inner circumferential surface of the seal body has a generally convex portion extending radially inward. The spring member or members are positioned generally tangentially to the intersection of the inner circumferential surface with either of the radial surfaces of the seal body to provide support for the convex portion and anti-extrusion properties for the seal body.

BRIEF DESCRIPTION OF THE DRAWINGS

FIG. 1 is a fragmentary view of a first embodiment of the seal seated in a groove in a wellhead and extending into contact with a casing.

FIG. 2 is a fragmentary view of an annular, non-metallic spring member comprised of a continuous, coiled ribbon-like filament.

FIG. 3 is a fragmentary view of a second embodiment of the seal seated in a groove in a wellhead and extending into contact with a casing.

DESCRIPTION OF THE PREFERRED EMBODIMENTS

The seal assembly of the present invention shown in FIG. 1 includes an annular seal body (10) seated in an annular groove (12) of a wellhead (14) in which a casing (16) is positioned. The seal body (10) has a generally rectangular shape in cross-section, having an upper radial surface (11), and a lower radial surface (13). A gap (18) exists between the wellhead (14) and the casing (16). The gap (18) may be attributable to manufacturing tolerances or eccentric positioning of the casing (16) relative to the wellhead (14). The annular seal body (10) is made from an elastomer or other suitable material having similar properties.

The sealing assembly further comprises a central convex portion (20) on the inner axial surface of the seal body (10) extending radially inward from an imaginary line connecting the radially inner ends of the radial surfaces (11,13). The convex portion (20) extends to a distance greater than the gap (18) so that when positioned in the wellhead (14) receiving the casing (16), the convex portion (20) extends across the gap (18) and compresses against the outer wall of the casing (16).

Embedded within the elastomer body (10) is at least one non-metallic annular spring member (22). The preferred embodiment of FIG. 1 shows two such spring members (22). The annular spring members (22) are positioned at the intersection of one of the circumferential surfaces of the seal body, preferably the inner circumferential surface (24), with either of the radial surfaces (11,13). The annular spring members (22) function as anti-extrusion elements and provide support for the extending convex portion (20). The spring members (22) enhance the seal body (10) resistance to deformation at the junction of the convex portion (20) and the seal body (10) when the convex portion (20) is subject to moment and compressive forces.

The annular, non-metallic spring members (22) are made from composite plastic materials which bond strongly to the elastomer seal body (10) and are softer than the seal surface materials in order to eliminate the risk of scratching or otherwise damaging the seal surfaces or other surfaces of the wellhead (14) and casing (16), or running tools. In addition, the non-metallic spring members (22) eliminate the risk of galvanic corrosion to various components. As shown in FIG. 2, each spring member (22) is made up of ribbon-like continuous filament (23) which is coiled to form an extension spring. The filament (23) is based on plastic, graphite, or glass fibers, including "KEVLAR" and polyetheretherketone (PEEK). They can be single or multiple strings, and composed of braided or singular elements. Each spring (22) may also be made up of multiple strand coils or braided coil springs. The finished springs may be cut to required lengths and connected at the ends to create annular spring shapes and then molded into the elastomer seal body (10).

FIG. 3 illustrates a second embodiment of the invention essentially similar to the embodiment shown in FIG. 1, except that only one spring element (22) is used.

Although the best mode contemplated for carrying out the present invention has been herein shown and described, it will be understood that modification and variation may be made without departing from what is regarded as the scope of the invention.

We claim:

1. A wellhead seal assembly for sealing between a first pipe member and a second pipe member wherein said first pipe member has an inside diameter and said second pipe member has an outside diameter which is smaller than said inside diameter, said pipe members being arranged such that said second pipe member is positioned generally concentrically within said first pipe member so that an annular gap of approximately a first distance exists between said first and second pipe members, wherein said seal assembly comprises:

an annular elastomeric body having, in cross-section, a generally rectangular shape comprising a first flat radial surface, a second flat radial surface, an inner circumferential surface, and an outer circumferential surface;

a generally convex sealing portion that extends from either said inner circumferential surface or said outer circumferential surface;

at least one annular, non-metallic spring member in said elastomeric body positioned generally tangentially to the intersection of either of said radial surfaces with said circumferential surface from which said convex sealing portion extends;

said spring member being constructed of a composite plastic filament comprising multiple strands of fibers selected from the group consisting of graphite, glass, Kevlar and PEEK, wherein said multiple strands of fibers are braided to form said filament.

2. A wellhead seal assembly according to claim 1, wherein said annular, non-metallic spring member comprises a continuous, coiled ribbon-like filament.

* * * * *